United States Patent
Liskey et al.

(10) Patent No.: US 9,238,202 B2
(45) Date of Patent: Jan. 19, 2016

(54) GAS SEPARATION MEMBRANES FROM CHEMICALLY AND UV TREATED POLYMERS OF INTRINSIC MICROPOROSITY

(71) Applicant: UOP LLC, Des Plaines, IL (US)

(72) Inventors: Carl W. Liskey, Chicago, IL (US); Michael B. Hamoy, Crystal Lake, IL (US); Chunqing Liu, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 61 days.

(21) Appl. No.: 14/104,492

(22) Filed: Dec. 12, 2013

(65) Prior Publication Data
US 2015/0165383 A1    Jun. 18, 2015

(51) Int. Cl.
*B01D 67/00* (2006.01)
*B01D 53/22* (2006.01)
*B01D 71/52* (2006.01)
*B01D 71/82* (2006.01)

(52) U.S. Cl.
CPC .......... *B01D 67/0006* (2013.01); *B01D 53/228* (2013.01); *B01D 71/52* (2013.01); *B01D 71/82* (2013.01); *B01D 2323/30* (2013.01); *B01D 2323/345* (2013.01); *B01D 2323/36* (2013.01); *B01D 2325/02* (2013.01)

(58) Field of Classification Search
CPC ............... B01D 53/226; B01D 53/228; B01D 67/0006; B01D 71/52; B01D 71/76; B01D 2323/345; B01D 2323/30; B01D 2323/36; B01D 2325/02; B01D 71/82
USPC .................................... 95/45, 50, 51; 96/4, 9
See application file for complete search history.

(56) References Cited

U.S. PATENT DOCUMENTS

| | | | |
|---|---|---|---|
| 7,758,751 B1 * | 7/2010 | Liu et al. | 95/45 |
| 2010/0096320 A1 | 4/2010 | Opperman | |
| 2012/0157743 A1 * | 6/2012 | Liu et al. | 585/818 |
| 2013/0217799 A1 | 8/2013 | Visser et al. | |
| 2013/0247756 A1 | 9/2013 | Li et al. | |
| 2014/0255636 A1 * | 9/2014 | Odeh et al. | 95/45 |
| 2014/0360366 A1 * | 12/2014 | Matteucci et al. | 95/45 |

FOREIGN PATENT DOCUMENTS

WO    2013043807 A1    3/2013

OTHER PUBLICATIONS

Du, Naiying et al., "Azide-based Cross-Linking of Polymers of Intrinsic Microporosity (PIMs) for Condensable Gas Separation", Macromolecular Rapid Communications, 2011, vol. 32, pp. 631-636.*
Du, "Azide-based Cross-Linking of Polymers of Intrinsic Microporosity (PIMs) for Condensable Gas Separation a,b", Macromol. Rapid Commun., 2011, 32, 631-636.
Search Report dated Mar. 12, 2015 for corresponding PCT Appl. No. PCT/US2014/068261.
Du, "Azide-based Cross-Linking of Polymers of Intrinsic Microporosity (PIMs) for Condensable Gas Separation", Macromol. Rapid Commun. 2011, 32, 631-636.
Thomas, "Size-Specific Ligands for RNA Hairpin Loops", J. Am. Chem. Soc. 2005, 127, 12434-12435.

* cited by examiner

*Primary Examiner* — Jason M Greene

(57) ABSTRACT

The invention is a process of making a chemically and UV treated polymer of intrinsic microporosity membrane comprising preparing a polymer of intrinsic microporosity, chemically cross-linking said polymer of intrinsic microporosity with a cross-linking compound to produce a chemically cross-linked polymer of intrinsic microporosity and then treating said chemically cross-linked polymer with UV radiation for a period of time sufficient to provide a product membrane. This product membrane is useful in the separation of C3 and higher hydrocarbons, as well as $CO_2$, from natural gas and other gas streams.

7 Claims, No Drawings

GAS SEPARATION MEMBRANES FROM CHEMICALLY AND UV TREATED POLYMERS OF INTRINSIC MICROPOROSITY

BACKGROUND OF THE INVENTION

This invention relates to gas separation membranes from chemically and UV treated polymers of intrinsic microprosity and methods for making and using these membranes.

Membrane-based technologies have advantages of both low capital cost and high-energy efficiency compared to conventional separation methods. Several applications of membrane gas separation have achieved commercial success, including nitrogen enrichment from air, carbon dioxide removal from natural gas and from enhanced oil recovery, and also in hydrogen removal from nitrogen, methane, and argon in ammonia purge gas streams. For example, UOP's Separex™ cellulose acetate (CA) spiral wound polymeric membrane is currently an international market leader for carbon dioxide removal from natural gas. Polymers provide a range of properties including low cost, high permeability, good mechanical stability, and ease of processability that are important for gas separation. Glassy polymers have stiffer polymer backbones and therefore let smaller molecules such as hydrogen and helium pass through more quickly, while larger molecules such as hydrocarbons pass through more slowly as compared to polymers with less stiff backbones. CA glassy polymer membranes are used extensively in gas separation. Currently, CA and polyimide membranes produced by UOP are used for natural gas upgrading, including the removal of carbon dioxide. Although these membranes have many advantages, improvements would be desirable in several areas including selectivity, permeability, and in chemical, thermal, and mechanical stability. In addition, gas separation processes based on glassy polymer membranes frequently suffer from plasticization of the stiff polymer matrix by the sorbed penetrating molecules such as CO2 or C3H6. Plasticization of the polymer is exhibited by swelling of the membrane structure and by a significant increase in the permeances of all components in the feed and decrease of selectivity occurring above the plasticization pressure when the feed gas mixture contains condensable gases.

Polymers of intrinsic microporosity (PIMs) were originally reported by McKeown, et. al. These polymers have an extremely porous structure because of their spirocyclic backbone. Membranes formed from these polymers exhibit extremely high permeability for gases such as CO2, CH4, and propylene. However, these membranes made from polymers of intrinsic microporosity typically have low selectivity for gas separations, including CO2/CH4 separations. U.S. Pat. No. 7,758,751 taught that some membranes made from polymers of intrinsic microporosity that are subjected to UV light display much higher selectivity. Diazides have shown the ability to undergo chemical cross-linking with certain polymers when subjected to high temperatures. Most notably, Guiver, et. al. (Macromol. Rapid Commun. 2011, 32, 631) showed that diazides can react with PIM-1 to generate chemically cross-linked structures. However, no significant improvement in selectivity of these membranes for carbon dioxide/methane separation was observed with these chemical crosslinking reagents. A desirable membrane needs to have a combination of high permeability with high selectivity.

The present invention discloses a new type of chemically and UV treated polymer of intrinsic microporosity membrane and methods for making and using these membranes.

SUMMARY OF THE INVENTION

The invention involves a process of making a chemically and UV treated polymer of intrinsic microporosity membrane comprising preparing a polymer of intrinsic microporosity, chemically cross-linking said polymer of intrinsic microporosity with a cross-linking compound to produce a chemically cross-linked polymer of intrinsic microporosity and then treating the chemically cross-linked polymer of intrinsic microporosity with UV radiation for a period of time sufficient to provide the chemically and UV treated polymer of intrinsic microporosity membrane.

DETAILED DESCRIPTION OF THE INVENTION

The present invention generally relates to a new type of chemically and UV treated polymer of intrinsic microporosity membrane made from polymer of intrinsic microporosity via chemical cross-linking followed by UV treatment. The present invention also relates to a method of making the chemically and UV treated polymer of intrinsic microporosity membrane, as well as the use of the chemically and UV treated polymer of intrinsic microporosity membrane for gas, vapor, and liquid separations.

First, a high permeability polymeric membrane made from a polymer of intrinsic microporosity (PIM) with incorporated cross-linking compound undergoes chemical cross-linking with the cross-linking compound such as a diazide or other cross-linking compound under thermal conditions. Then the resulting polymer is subjected to UV treatment to further modify the membrane structure.

The chemical structures of some representative PIMs that are used to make the chemically and UV treated PIM membrane described in the current invention and their preparation are indicated hereinafter.

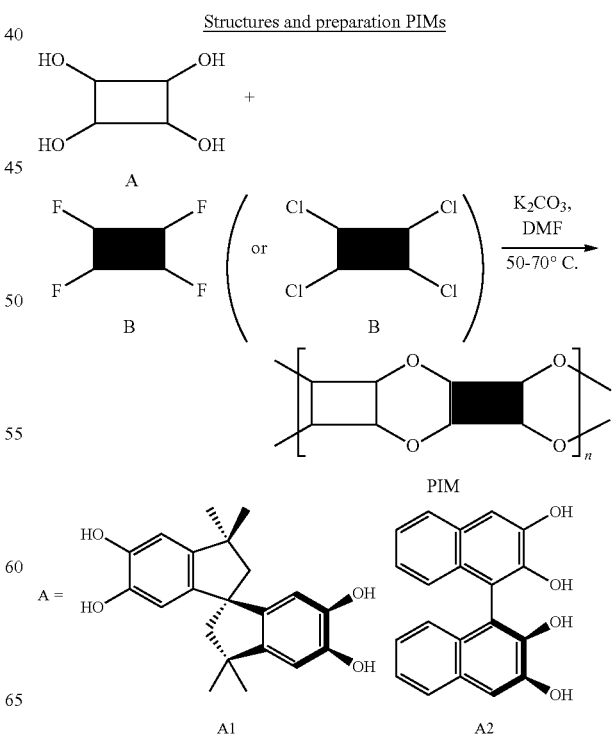

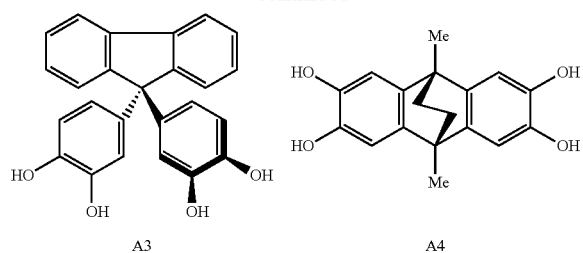
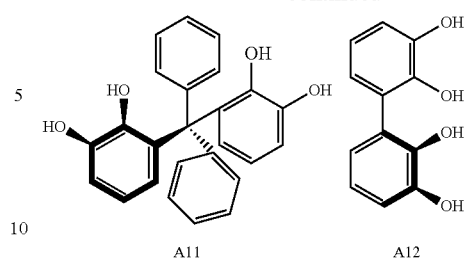
A3  A4  A11  A12
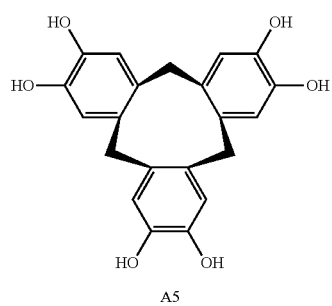
A5
Further structures and preparation of PIMS
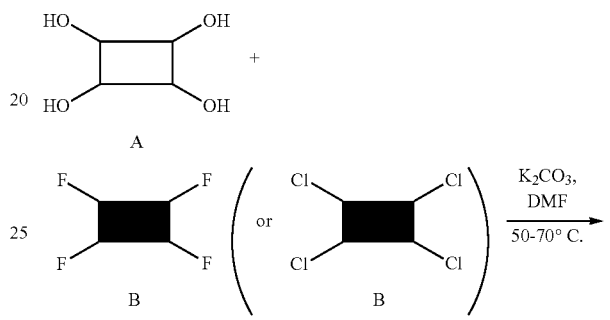
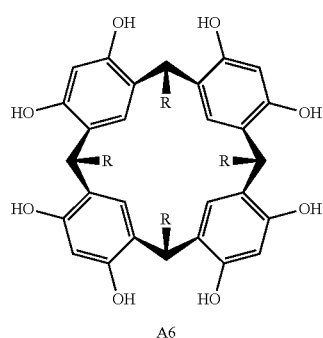
A6
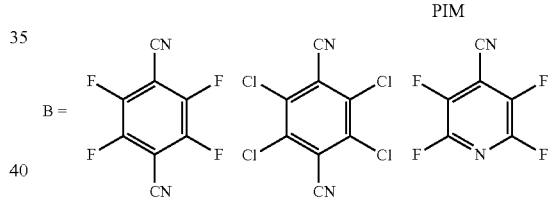
B1  B2  B3
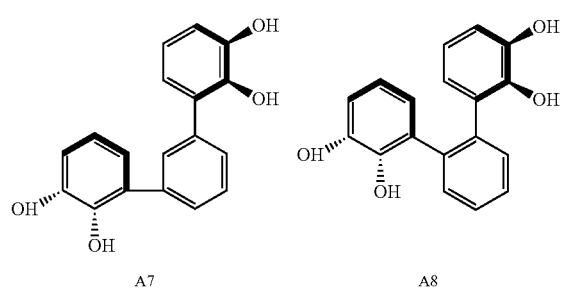
A7  A8
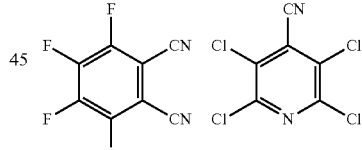
B4  B5
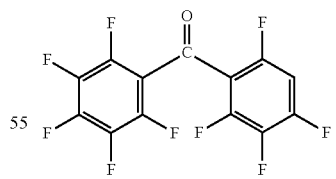
B6
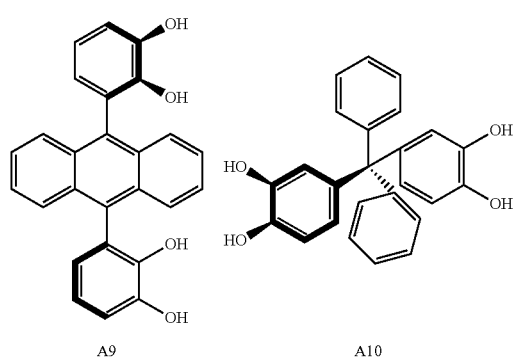
A9  A10
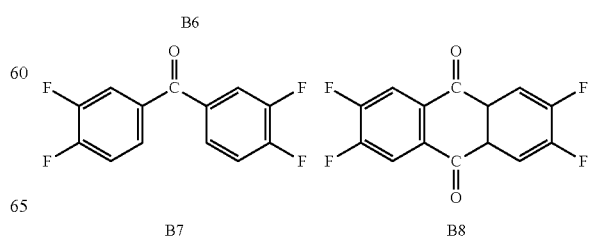
B7  B8

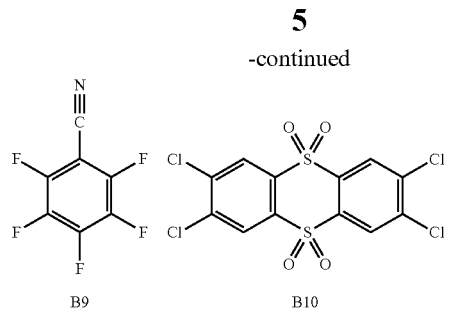

B9  B10

The dioxane formation (i.e., a double aromatic nucleophilic substitution) offers a general reaction for the preparation of PIMs from appropriate hydroxylated aromatic monomers (e.g., A1-A12) and fluorinated (or chlorinated) aromatic monomers (e.g., B1-B10). These PIMs to be used as membrane materials for the preparation of the chemically and UV treated PIM membrane in the present invention may be prepared according to the literature procedure.

The diazide cross-linking compound contains a UV cross-linkable group, such as a sulfonyl or carbonyl group. The diazides that are useful in the present invention have a general structure of

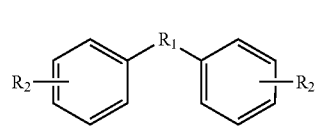

(I)

wherein R1 is a divalent moiety comprising carbon, oxygen, sulfur, or nitrogen, and comprising a group that is sensitive to UV light, such as a carbonyl or sulfonyl group; wherein R2 is a divalent moiety that contains an azide.

An alternative cross-linking compound has a general structure of

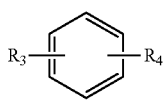

(II)

wherein R3 and R4 contain substituents that are sensitive to UV light, such as azide, aldehyde, ketone, and sulfone groups. Some preferred cross-linking compounds with structure (II) include

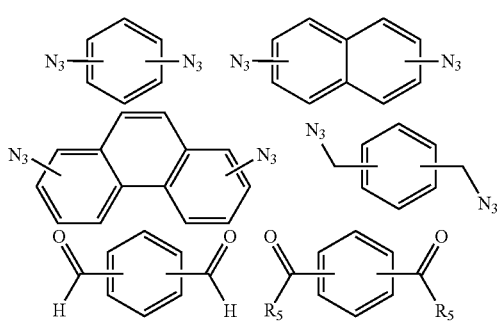

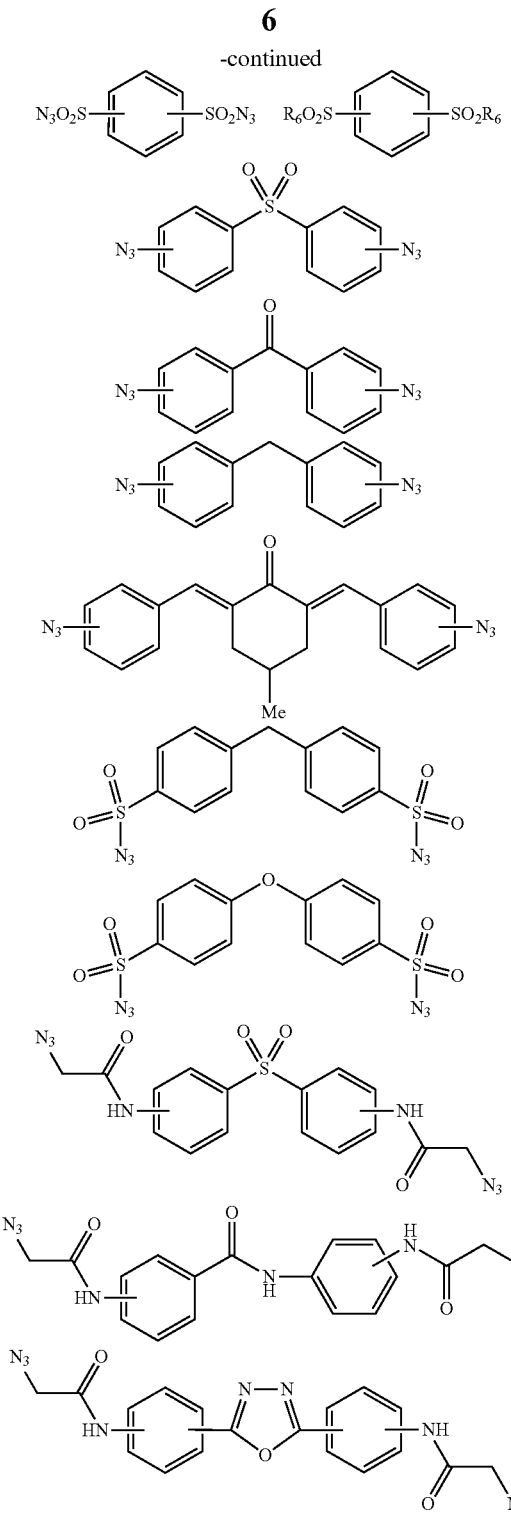

wherein R5 is selected from a group consisting of —(CH$_2$)$_n$CH$_3$, C$_6$H$_5$, C$_6$H$_4$CH$_3$, and Cl and mixtures thereof; wherein R6 is selected from a group consisting of —(CH$_2$)$_m$CH$_3$, C$_6$H$_5$, and C$_6$H$_4$CH$_3$, and mixtures thereof; wherein n and m are independent integers from 0 to 9. The chemically cross-linked PIM membrane is treated with UV light to form a membrane with higher selectivity. The new chemically cross-linked and UV treated PIM membrane has several advantages. Gas permeation tests reveal that the selectivity for CO$_2$/CH$_4$ separation is high with the chemically cross-linked and UV treated PIM with a diazide. Specifically, the selectivity is significantly higher with the chemically cross-linked and UV treated PIM membrane relative to the solely chemically cross-linked PIM membrane. The permeability is much higher than comparable current commercial gas separation membranes such as CA membrane and polyimide membrane. The chemical cross-linking plus UV treatment process led to excellent chemical resistance, specifically better chemical resistance than commercial membranes. This chemical resistance prevents problems with contamination by longer chain hydrocarbon and $CO_2$ plasticization. Overall, the chemically and UV treated polymer of intrinsic microporosity membrane described in the present invention is more stable than prior art membranes as demonstrated by their decreased solubility following the chemical crosslinking and UV treatment. The chemical cross-linking led to slightly higher selectivity for $CO_2/CH_4$ separation than the high permeability parent PIM. With both chemical and UV treatment much higher selectivity is observed after certain time of UV treatment. This shows that the selectivity and permeance can be tuned by the UV treatment time. Also, the amount of cross-linking compound such as the diazide that is added controls the selectivity. The $CO_2/CH_4$ selectivity is higher than 25 and the permeance is much higher compared to the commercial cellulose acetate and polyimide membranes.

The weight ratio of the cross-linking compound to the polymer of intrinsic microporosity described in the current invention is in a range of 1:1 to 1:50.

The PIM polymer with the incorporated/azide cross-linking compound described in the present invention has good membrane processability before cross-linking, which is important for making a commercially viable membrane. The PIM polymer with the incorporated azide cross-linking compound is soluble in various organic solvents, including tetrahydrofuran, dichloromethane, and N-methylpyrrolidone (NMP). When the PIM polymer with the incorporated azide cross-linking compound is dissolved in organic solvents, a homogenous solution is obtained. Dense film membranes formed from the PIM polymer with the incorporated azide cross-linking compound are also clear and homogenous.

The precursor materials were prepared by known methods. As an example, PIM-1 was prepared according to US20130217799A1 that set forth the following small-scale synthesis process: A 100 mL three-necked round bottom flask, which was equipped with an overhead mechanical stirrer, an gas inlet, and a Dean-Stark trap with condenser and gas outlet, was charged with 3.4044 g of 5,5',6,6'-tetrahydroxy-3,3,3',3'-tetramethylspirobisindane (TTSBI), 2.0054 g of tetrafluoroterephthalonitrile (TFTPN), 3.24 g of anhydrous potassium carbonate, 15 mL of NMP and 5 mL of toluene. Under nitrogen flow, the mixture was stirred at 155° C. under 340 rpm for 1 h. The reaction was then stopped and the reaction solution was diluted with 30 mL more NMP and precipitated into water. After several times of washing with acidic de-ionized water, the bright yellow fiber product was further washed with methanol once and collected by filtration.

The chemical cross-linking of a diazide and PIM-1 was adapted from Guiver et. al. Macromol. Rapid Commun 2011, 32, 631. The diazide was prepared as known in the art such as according to J. Am. Chem. Soc. 2005, 127, 12434. Representative example for the formation of dense films: The chemically cross-linked PIM-1 polymer membranes were prepared from casting a 10-20 wt % solution of PIM-1 and diazide (90:10) in a suitable organic solvent on a clean glass plate with a casting knife. The solvent was allowed to evaporate at room temperature inside a plastic cover. The membranes were detached from the glass plate and dried at 175° C. for 12 hours under vacuum. A color change was observed following the heat treatment. The membranes were transparent, around 20-100 μm thick and were cut into small circles for pure gas permeation measurements. The solvents that can be used for dissolving PIM-1 include methylene chloride, THF, NMP, and others known to those skilled in the art.

The chemical and UV-treated PIM membranes were prepared by further UV-treating the chemically cross-linked PIM-diazide membranes containing UV-cross-linkable groups using a UV lamp from a certain distance and for a period of time selected based upon the separation properties sought. For example, UV-cross-linked PIM-1-diazide membranes can be prepared from the chemically cross-linked PIM-1-diazide membrane by exposure to UV radiation using 254 nm wavelength UV light generated from a UV lamp with 1.9 cm (0.75 inch) distance from the membrane surface to the UV lamp and a radiation time of 30 min at less than 50° C. The UV lamp described here a low pressure, mercury arc immersion UV quartz 12 watt lamp with 12 watt power supply from Ace Glass Incorporated. Optimization of the UV treatment degree in the UV-treated PIM membranes from the chemically cross-linked PIM-diazide should promote the tailoring of membranes for a wide range of gas and liquid separations with improved permeation properties and environmental stability. The UV treatment degree of the UV-treated PIM membranes from PIM-diazide (or other chemical cross-linking agent) can be controlled by adjusting the distance between the UV lamp and the membrane surface, UV radiation time, wavelength and strength of UV light, etc. Preferably, the distance from the UV lamp to the membrane surface is in the range of 0.8 to 25.4 cm (0.3 to 10 inches) with a UV light provided from 12 watt to 450 watt low pressure or medium pressure mercury arc lamp, and the UV radiation time is in the range of 1 min to 1 h. More preferably, the distance from the UV lamp to the membrane surface is in the range of 1.3 to 5.1 cm (0.5 to 2 inches) with a UV light provided from 12 watt to 450 watt low pressure or medium pressure mercury arc lamp, and the UV radiation time is in the range of 1 to 40 minutes.

The permeability coefficient ($P_A$) and selectivity ($\alpha_{A/B}$) of the chemically-cross-linked PIM membranes and the UV-treated and chemically-cross-linked PIM membranes were measured by pure gas measurements at 50° C. under about 791 kPa (100 psig) pressure. The pure gas measurements were conducted by a time-lag method. This method measures pressure increases in a constant downstream volume as a function of time to determine the permeability. Each test was performed after the whole unit was degassed to a pressure of 1-10 mTorr and the system reached thermal equilibrium.

For example, the permeability and selectivity of the chemically cross-linked PIM-1-diazide membrane and the chemically cross-linked and UV-treated PIM-1-diazide membrane for $CO_2/CH_4$ separation were measured by pure gas measurements at 50° C. under about 791 kPa (100 psig) pressure. Gas permeation data for $CO_2/CH_4$ separation are presented in Table for membranes formed from PIM-1-diazide following chemical cross-linking and PIM-1-diazide following chemical cross-linking and UV treatment. Both chemically cross-linked PIM-1-diazide-UV-10 min and chemically cross-linked PIM-1-diazide-UV-30 min membranes containing PIM-1 polymer chain segments cross-linked to each other through direct covalent bonds formed from UV treatment and chemical cross-linking showed significantly improved $CO_2/CH_4$ selectivities compared to the original PIM-1 membrane and the chemically cross-linked PIM-1-diazide membrane without UV treatment.

TABLE

Tested at 50° C. under 791 kPa (100 psig) pure gas pressure

| Gas Separation Performance for UV Treated and Chemically Cross-Linked PIM-1-Diazide Dense Films Dense film | $P_{CO2}$ (Barrer) | $\alpha_{CO2/CH4}$ | $P_{H2}$ (Barrer) | $\alpha_{H2/CH4}$ | $P_{N2}$ (Barrer) | $\alpha_{N2/CH4}$ |
|---|---|---|---|---|---|---|
| PIM -1 (no diazide) | 3998 | 7.32 | 2672 | 4.89 | 358 | 0.655 |
| Chemically x-linked PIM-1-diazide (no UV) | 688.1 | 13.4 | 681.7 | 13.2 | 40.3 | 0.783 |
| Chemically x-linked PIM-1-diazide-UV10 min | 559.6 | 17.8 | 651.4 | 20.7 | — | — |
| Chemically x-linked PIM-1-diazide-UV30 min | 181.7 | 27.1 | 558.3 | 83.2 | 7.12 | 1.06 |

The invention claimed is:

1. A process of making a chemically cross-linked and UV cross-linked polymer of intrinsic microporosity membrane comprising preparing a polymer of intrinsic microporosity, chemically cross-linking said polymer of intrinsic microporosity with a chemical cross-linking compound to produce a chemically cross-linked polymer of intrinsic microporosity and then UV cross-linking said chemically cross-linked polymer of intrinsic microporosity with a UV cross-linking compound and UV radiation for a period of time sufficient to provide said chemically cross-linked and UV cross-linked polymer of intrinsic microporosity membrane.

2. The process of claim 1 wherein said cross-linking compound is

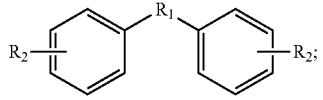

wherein $R_1$ is a divalent moiety consisting of carbon, oxygen, sulfur, or nitrogen; $R_2$ is a divalent moiety that contains an azide.

3. The process of claim 1 wherein said UV cross-linking compound has a general structure

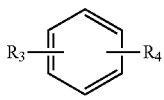

wherein R3 and R4 comprise substituents that are sensitive to UV light and are selected from a group consisting of aldehyde, ketone, sulfone, and mixtures thereof.

4. The process of claim 1 wherein said cross-linking compound is selected from the group consisting of

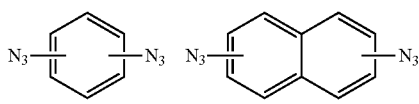

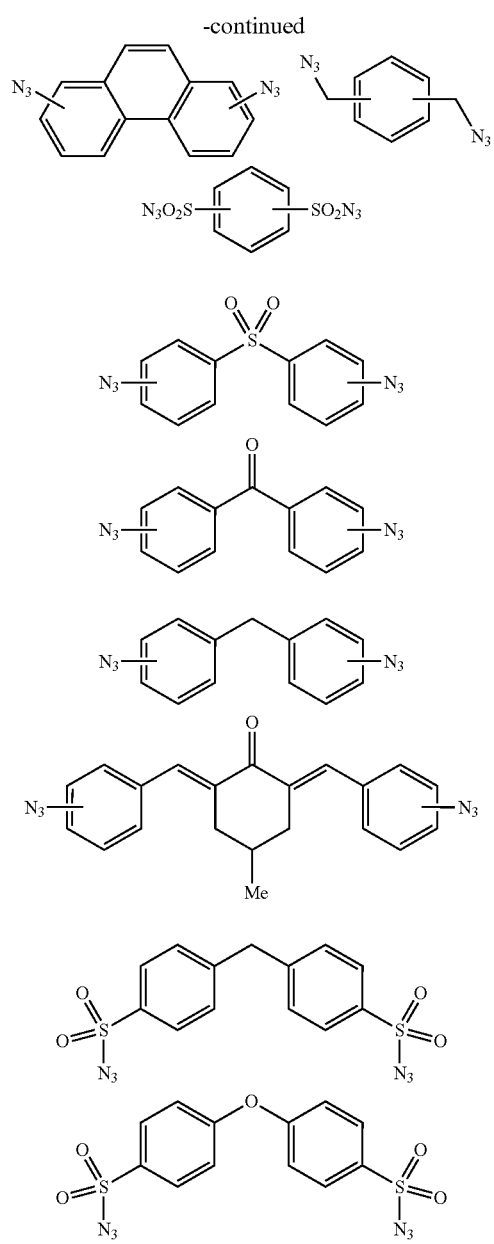

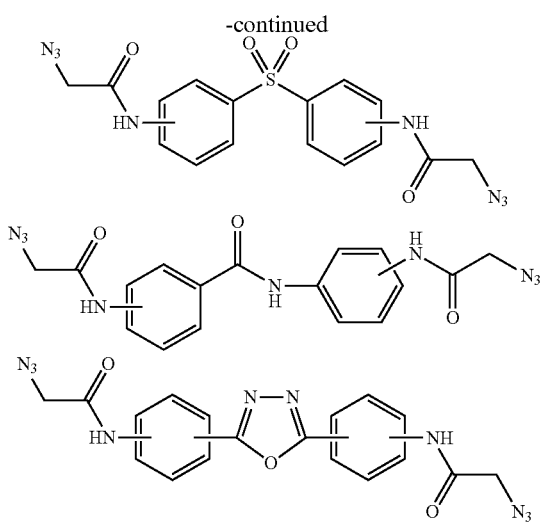

and mixtures thereof.

5. The process of claim 3 wherein said group that is sensitive to UV light is a carbonyl or sulfonyl group.

6. The process of claim 2 wherein said UV cross-linking compound is selected from the group consisting of

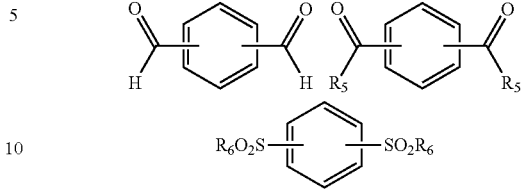

and mixtures thereof, wherein R5 is selected from a group consisting of —$(CH_2)_n CH_3$, $C_6H_5$, $C_6H_4CH_3$, and Cl and mixtures thereof; wherein R6 is selected from a group consisting of —$(CH_2)_m CH_3$, $C_6H_5$, and $C_6H_4CH_3$, and mixtures thereof; wherein n and m are independent integers from 0 to 9.

7. The process of claim 1 wherein said polymer of intrinsic microporosity comprises a reaction product of 3,3',3'-tetramethyl-1,1''-spirobisindane-5,5',6,6'-tetrol and 2,3,5,6-tetrafluoroterephthalonitrile.

* * * * *